United States Patent [19]

Henderson

[11] Patent Number: 4,709,861
[45] Date of Patent: Dec. 1, 1987

[54] EXPELLED DEFLECTOR FOR MANURE SPREADERS

[75] Inventor: James S. Henderson, New Holland, Pa.

[73] Assignee: New Holland Inc., New Holland, Pa.

[21] Appl. No.: 921,652

[22] Filed: Oct. 21, 1986

[51] Int. Cl.⁴ ............................................. A01C 15/16
[52] U.S. Cl. ................................... 239/675; 239/676
[58] Field of Search .............. 239/662, 664, 665, 666, 239/675, 676

[56] References Cited

U.S. PATENT DOCUMENTS

| | | |
|---|---|---|
| 2,956,809 | 10/1960 | Huddle et al. .................. 239/666 |
| 4,362,272 | 12/1982 | Martin . |
| 4,467,967 | 8/1984 | Martin . |
| 4,473,184 | 9/1984 | Martin . |

FOREIGN PATENT DOCUMENTS

| | | |
|---|---|---|
| 395995 | 7/1933 | United Kingdom ................ 239/666 |
| 2157141 | 10/1985 | United Kingdom . |
| 2157142 | 10/1985 | United Kingdom . |
| 2159033 | 11/1985 | United Kingdom . |
| 971143 | 11/1982 | U.S.S.R. .............................. 239/666 |

Primary Examiner—Andres Kashnikow
Assistant Examiner—Karen B. Merritt
Attorney, Agent, or Firm—Darrell F. Marquette; Frank A. Seemar; Larry W. Miller

[57] ABSTRACT

In a manure spreader having a tank for containing manure and an expeller for discharging manure away from the tank, an expeller deflector is located proximate the expeller on the inner side thereof. The expeller deflector cooperates with the expeller in breaking up clumps of manure after they exit the tank but before they are discharged by the expeller.

6 Claims, 4 Drawing Figures

4,709,861

EXPELLED DEFLECTOR FOR MANURE SPREADERS

BACKGROUND OF THE INVENTION

This invention relates generally to manure spreader and, in particular, to an expeller deflector for manure spreaders.

When spreading sticky or lumpy manure with the type of manure spreader disclosed in U.S. Pat. No. 4,362,272, the spread pattern may be uneven with large clumps of manure being discharged near the manure spreader. While an uneven spread pattern may not be critical when spreading manure on a field which will be tilled before planting crops, it is unacceptable when trying to spread a fine, light pattern on a field that will be harvested again later in the season. The material which has been the most difficult to spread evenly is industrial waste sludge from sewage treatment plants. This material clings in the area above the expeller and then drops off into the spread pattern in large clumps.

SUMMARY OF THE INVENTION

It is an object of the present invention to provide means for use on the type of manure spreader disclosed in U.S. Pat. No. 4,362,272 which assists in breaking up large clumps of material to thereby ensure an even spread pattern.

The present invention is directed to a manure spreader having a tank for containing manure, an auger rotatably mounted in the tank for moving manure toward an opening formed in the tank, and an expeller rotatably disposed adjacent the opening in the tank to discharge manure away from the tank. The improvement of the present invention comprises means cooperating with the expeller for breaking up clumps of manure after they exit the tank through the opening therein but before they are discharged by the expeller.

In the preferred embodiment of the present invention, th expeller engages manure exiting the tank through the opening on an inner upstream side of the expeller. The means for breaking up clumps of manure comprises deflector means located on the inner upstream side of the expeller.

DESCRIPTION OF THE PREFERRED EMBODIMENT

Figure 1:
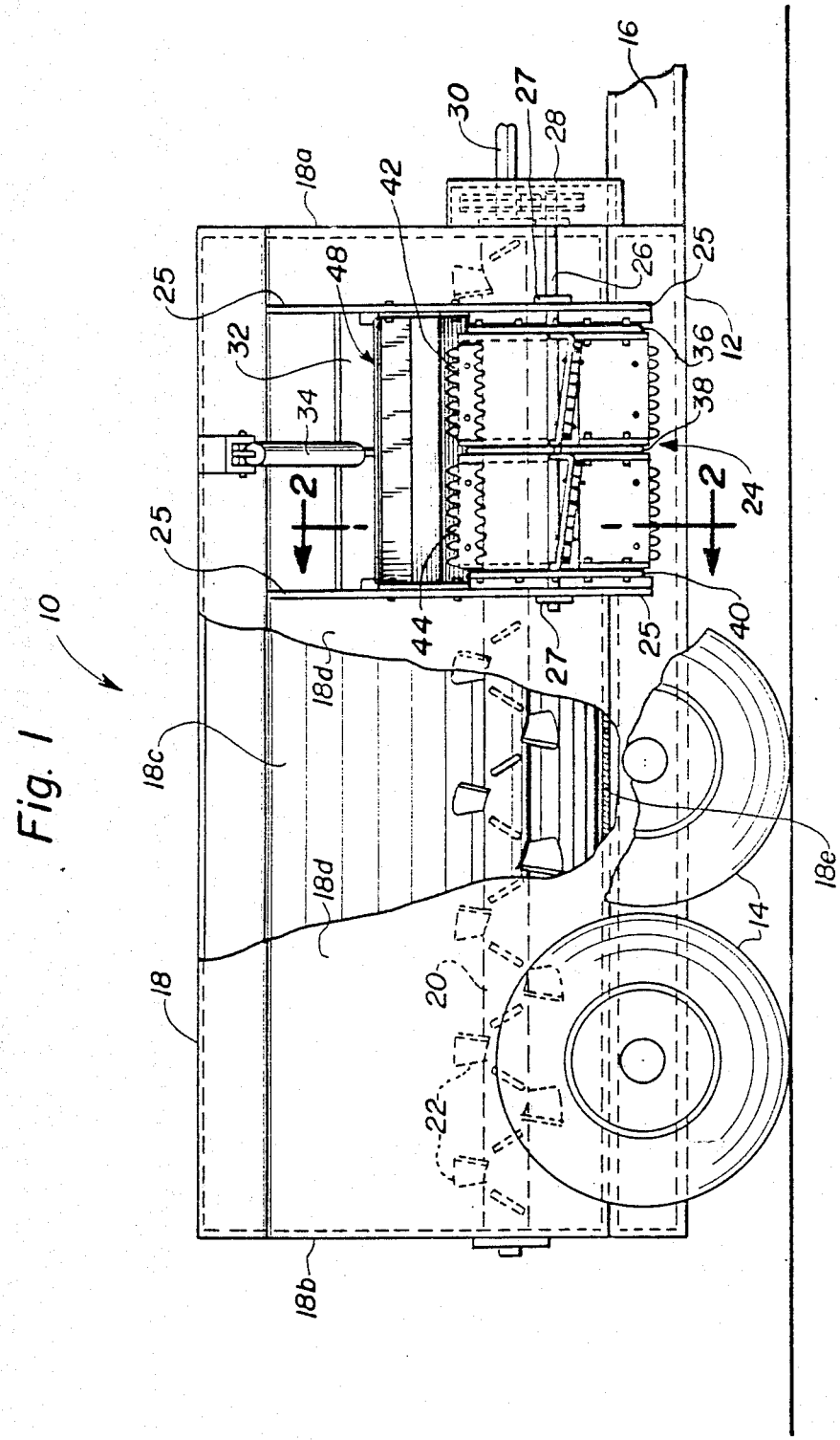
FIG. 1 is a right side elevation view, with portions broken away, of a manure spreader incorporating the expeller deflector of the present invention.

A manure spreader 10 shown in FIG. 1 includes a base frame 12 supported by wheels 14. A tongue 16 is fixed to the base frame 12 at the forward end thereof and is adapted for connection to a towing vehicle such as a tractor (not shown). A tank 18 for containing manure is mounted on the base frame 12, and an auger 20 is rotatably mounted in the tank 18 near the bottom thereof. The tank 18 is comprised of endwalls 18a and 18b arranged parallel to each other, and sidewalls 18c and 18d arranged to slope toward each other to form a bottom wall 18e. The auger 20 has flights 22 to move manure toward an opening 23 formed in the tank sidewall 18d.

An expeller 24 is rotatably disposed between a pair of panel members 25 adjacent the opening 23 in the tank sidewall 18d to discharge manure generally in a lateral direction away from the tank 18. The expeller 24 includes a central shaft 26 which is supported by bearings 27 carried by panel members 25. The central shaft 26 is rotated via a chain and sprocket drive 28 from the axial shaft 30 of the auger 20. A door 32 is slidably mounted on the tank sidewall 18d between panel members 25 for closing the opening 23 either fully or partially, and a hydraulic cylinder 34 is connected between door 32 and the tank 18 to raise and lower the door 32. The expeller 24 includes support members 36,38 and 40 fixed to the central shaft 26 in a spaced apart relationship and disposed parallel to each other. One set of paddles 42 is mounted between the support members 36 and 38, and another set of paddles 44 is mounted between the support members 38 and 40. A pan 46 is mounted between the panel members 25 underneath the expeller 24.

Figure 2:
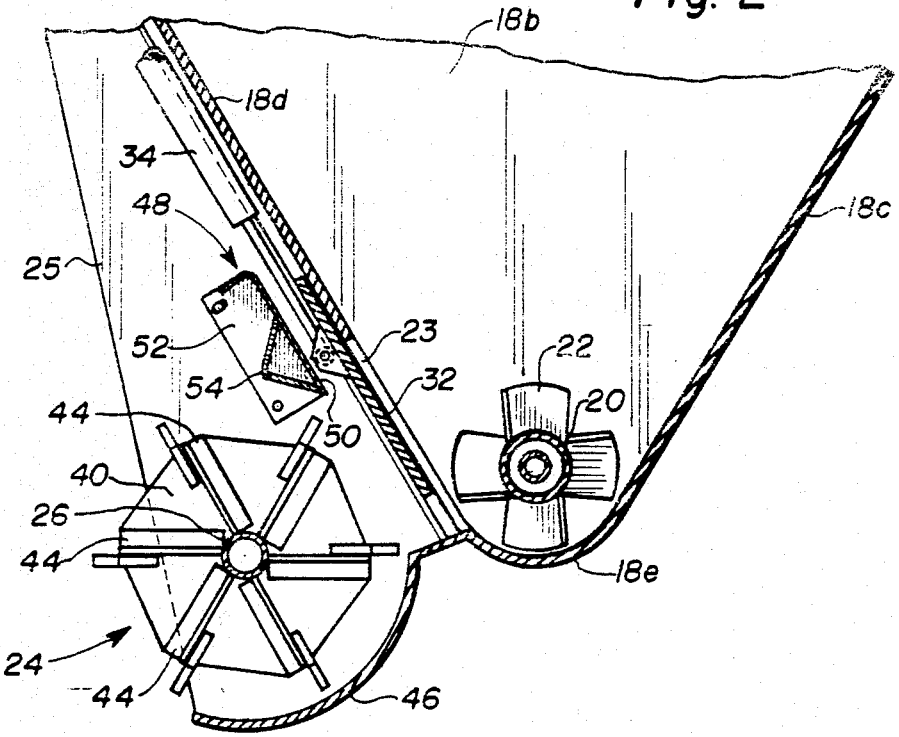
FIG. 2 is an enlarged sectional view taken along lines 2—2 in FIG. 1.

During operation of the manure spreader 10, the auger 20 rotates in a clockwise direction and the expeller 24 rotates in a counterclockwise direction as viewed and indicated in FIG. 2. This counterclockwise rotation of the expeller 24 causes the paddles 42 and 44 to engage manure exiting the tank 18 through the opening 23 in the tank sidewall 18d on the inner upstream side of the expeller 24 and thereby discharge the manure away from the tank 18 in an "overshot" manner.

Figure 3:
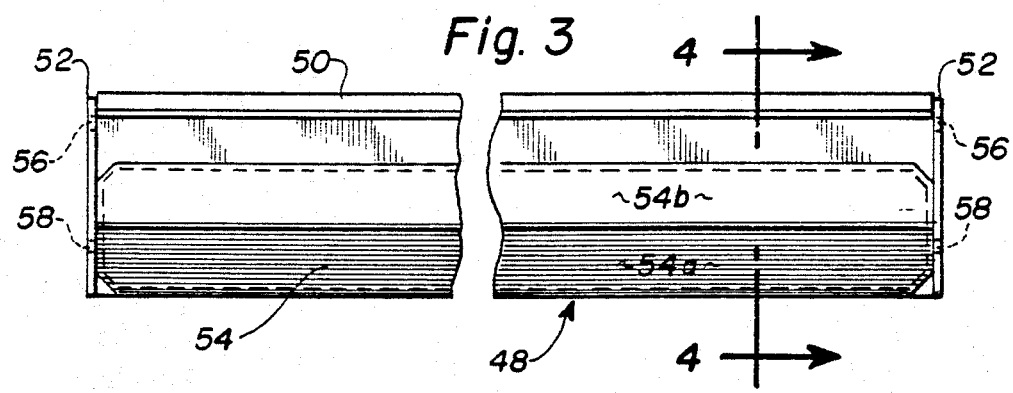
FIG. 3 is a front elevation view of the expeller deflector of the present invention.
Figure 4:
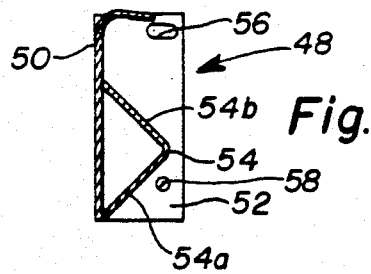
FIG. 4 is a sectional view taken along lines 4—4 in FIG. 3.

An expeller deflector 48, according to the present invention, extends between and is mounted to the panel members 25 proximate the expeller 24. The expeller deflector 48 is positioned on the inner upstream side of the expeller 24 in an area between the opening 23 and the outer downstream side of the expeller 24. As best seen in FIGS. 3 and 4, the expeller deflector 48 includes a back plate 50 extending between and secured to a pair of end plates 52, and a V-shaped front plate 54 extending between and secured to the end plates 52 and also to the back plate 50. The end plates 52 are provided with holes 56,58 for receiving fasteners such as bolts to releasably fasten the expeller deflector 48 to the panel members 25. The expeller deflector 48 is positioned so that the lower section 54a of the front plate 54 is approximately ½ inch from the outer edges of the expeller paddles 42,44. Preferably, the width of the front plate lower section 54a does not exceed 4 inches.

In operation, the expeller deflector 48 cooperates with the expeller 24 to break up large clumps of manure and to prevent manure from overfeeding the expeller 24 and thereby flowing over the expeller 24 without actually being engaged by the paddles 42,44 thereof. The location of the expeller deflector 48 on the inner upstream side of the expeller 24 as seen in FIG. 2 ensures that any large clumps of manure are broken up after they exit the tank 18 via the opening 23 but before they are discharged away from the tank 18. The back plate 50 of the expeller deflector 48 prevents manure from flowing up and over the expeller deflector 48 especially when the door 32 is fully raised, and the upper section 54b of the front plate 54 prevents manure from accumulating between the front plate lower section 54a and the back plate 50.

It will be understood that while the door 32 may be raised and lowered to vary the width of the spread pattern, the consistency of the spread pattern will be maintained because the location of the expeller deflector 48 relative to the expeller 24 is unaffected since the expeller deflector 48 is not mounted on or connected with the door 32. Door mounted expeller deflectors such as disclosed in U.S. Pat. No. 4,362,272 cannot maintain spread pattern consistency when the door is moved to different positions.

It is also understood that in an alternative embodiment of the present invention, the expeller 24 may rotate in a clockwise direction when viewed in FIG. 2 and thereby discharge manure away from the tank 18 in an "undershot" manner. In such an arrangement, the expeller deflector 48 would be located on the inner downstream side of the expeller 24 proximate the pan 46.

Having thus described the invention, what is claimed is:

1. In a manure spreader having a tank for containing manure, an auger rotatably mounted in said tank for moving manure toward an opening formed in said tank, an expeller rotatably disposed adjacent said opening to discharge manure away from said tank, said expeller engaging manure exiting said tank through said opening on an inner side of said expeller, the improvement comprising:
   deflector means located on said inner side of said expeller and cooperating with said expeller for breaking up clumps of manure after they exit said tank through said opening but before they are discharged by said expeller.

2. In the manure spreader of claim 1, further comprising a door slidably mounted on said tank for closing said opening, and wherein said deflector means is located proximate said door.

3. In the manure spreader of claim 2, wherein said deflector means comprises a back plate extending between and connected to a pair of end plates, and a substantially V-shaped front plate extending between and connected to said end plates and to said back plate.

4. In the manure spreader of claim 3, wherein said expeller comprises paddles, and said V-shaped front plate of said deflector means includes upper and lower sections with one of said upper and lower sections being located proximate the outer edges of said paddles.

5. In the manure spreader of claim 2, wherein the inner side of said expeller is the upstream side thereof.

6. In the manure spreader of claim 2, further comprising a pair of panel members attached to said tank, said expeller disposed between said panel members, and said deflector means extending between and connected to said panel members proximate said expeller.

* * * * *